United States Patent

Carine et al.

[11] Patent Number: 6,152,525
[45] Date of Patent: Nov. 28, 2000

[54] CHILD SAFETY SEAT

[75] Inventors: Shaun Carine; David Lovie, both of Andover, United Kingdom

[73] Assignee: Britax-Excelsior Limited, Gallows Hill, United Kingdom

[21] Appl. No.: 09/198,419

[22] Filed: Nov. 24, 1998

[30] Foreign Application Priority Data

Dec. 2, 1997 [GB] United Kingdom .................. 9725494

[51] Int. Cl.⁷ ..................................................... B60N 2/42
[52] U.S. Cl. ...................... 297/216.11; 108/9; 297/250.1
[58] Field of Search .......................... 297/250.1, 256.13, 297/256.15, 253, 216.11; 108/1, 9, 44

[56] References Cited

U.S. PATENT DOCUMENTS

| | | | |
|---|---|---|---|
| 4,610,415 | 9/1986 | Miller | 108/1 X |
| 4,770,468 | 9/1988 | Shubin | 297/256.15 X |
| 5,110,182 | 5/1992 | Beauvais | 297/256.13 X |
| 5,228,746 | 7/1993 | Burleigh | 297/250.1 |
| 5,236,221 | 8/1993 | Minami | 297/256.13 X |
| 5,611,596 | 3/1997 | Barley et al. | 297/256.13 |
| 5,971,479 | 10/1999 | Jacquemot et al. | 297/250.1 X |

FOREIGN PATENT DOCUMENTS

| | | |
|---|---|---|
| 0 631 903 A1 | 1/1995 | European Pat. Off. . |
| 0 640 508 B1 | 3/1995 | European Pat. Off. . |
| 0 732 235 A2 | 9/1996 | European Pat. Off. . |
| 2 641 236 | 7/1990 | France . |
| 2 641 244 | 7/1990 | France . |
| 2 686 298 | 7/1993 | France . |
| 2 087 226 | 5/1982 | United Kingdom . |

Primary Examiner—Peter M. Cuomo
Assistant Examiner—Stephen Vu
Attorney, Agent, or Firm—Davis and Bujold

[57] ABSTRACT

A child safety seat comprising a seat body and a base, is adapted to be secured on a vehicle seat by a lap strap of a vehicle seat belt. A front foot is pivotally mounted on the front part of the seat body so as to be movable between a first position and a second position in which it projects downwardly from the seat body to a greater extent that when in its first position so as to compress the front part of the vehicle seat cushion. This reduces the extent of angular movement of the child seat which can take place subsequent to installation, for example during an accident, before the front foot abuts against the rigid structure of the vehicle seat with the maximum possible compression of the seat cushion trapped therebetween.

19 Claims, 9 Drawing Sheets

CHILD SAFETY SEAT

FIELD

This invention relates to a child safety seat of the type child safety seat comprising a seat body and a base, adapted to be secured on a vehicle seat by fixing means extending from a rear part of the seat body. The base may be formed integrally with the seat body or may comprise a separate component.

RELATED ART

Hitherto, the fixing means for seats of this type has consisted of a vehicle lap seat belt or the lap portion of a vehicle lap and diagonal seat belt. In the latter case, means may be provided for coupling the diagonal portion of the vehicle seat belt to the child safety seat above the level at which the lap portion engages therewith.

Alternatively, it has been proposed to provide of child safety seats of this type with fixing means comprising rearwardly extending projections adapted to extend between the seat cushion and the backrest of the vehicle seat so as to engage with rigid anchorages on the vehicle body.

With a child safety seat having fixing means of either of these types, in the event of an accident involving a fore-and-aft component of acceleration, the inertial force of the body of a child occupant of the seat applies a couple tending to cause angular movement of the child seat about a horizontal transverse axis approximately coincident with the upper rear edge of the seat cushion. Since vehicle seats commonly have compressible seat cushions, compression of the front edge of the vehicle seat cushion as a result of such angular movement can lead to undesirable forward movement of the head of the child occupant. In extreme cases, this could result in the child's head coming into contact with some other fixed object in the vehicle. This problem can be mitigated to some extent by ensuring that the fixing means is tightened sufficiently to pre-compress the seat cushion and backrest of the vehicle seat. This requires considerable force.

SUMMARY OF THE INVENTION

According to the invention, a child safety seat of the type described above further comprises a front foot mounted on the base so as to support the front part thereof, the front foot being movable between a first position and a second position in which it projects downwardly from the seat body to a greater extent that when in its first position.

The term "front" is used herein to refer to that part of the child seat which is closest to the front of a vehicle seat when properly installed thereon.

In use, the child seat is installed on the vehicle seat and the fixing means connected while the foot is in its first position. The foot is then moved to its second position, thereby compressing the front portion of the vehicle seat cushion. Such compression of the seat cushion reduces the extent of angular movement of the child seat which can take place subsequent to installation, for example during an accident, before the front foot abuts against the rigid structure of the vehicle seat with the maximum possible compression of the seat cushion trapped therebetween.

Preferably, the child seat also comprises a manually operable member having a hand grip portion for moving the front foot from its first position to its second position, the distance of movement of the hand grip portion being greater than the distance of movement of the front foot. This provides mechanical advantage to effect compression of the seat cushion.

Embodiments of the invention will now be described by way of example, with reference to the accompanying drawings, in which:

DETAILED DESCRIPTION OF PREFERRED EMBODIMENTS

Referring to FIGS. 1 to 4, a child safety seat comprises having a seat body 10 equipped with a child harness 12 of known design. In this embodiment, the seat body 10 is pivotally mounted on a base 14 by a pair of pivot pins 16, one on each side of the seat, and a conventional recline mechanism (not shown) controls angular movement of the seat body 10 about the pivot pins 16. However, the seat body may be formed integrally with the base if desired.

The base 14 includes a belt guide 18 for engagement by a lap strap 20 of a vehicle seat belt, whereby the child seat may be secured to a vehicle seat with the base 14 resting on the cushion 22 and the seat body 10 abutting the backrest 24 thereof.

In accordance with the invention, a cavity 26 is formed in the bottom surface of the front part of the base 14. The cavity is partially covered by a flap 28 which is pivotally mounted on a pair of pins 30 for angular movement about its rear edge. The flap 28 is biassed into engagement with a pair of cams 32 by a spring (not shown). The cams 32 are pivotally mounted within the cavity 26 and are coupled to a pair of manual operating levers 34.

Figure 1:
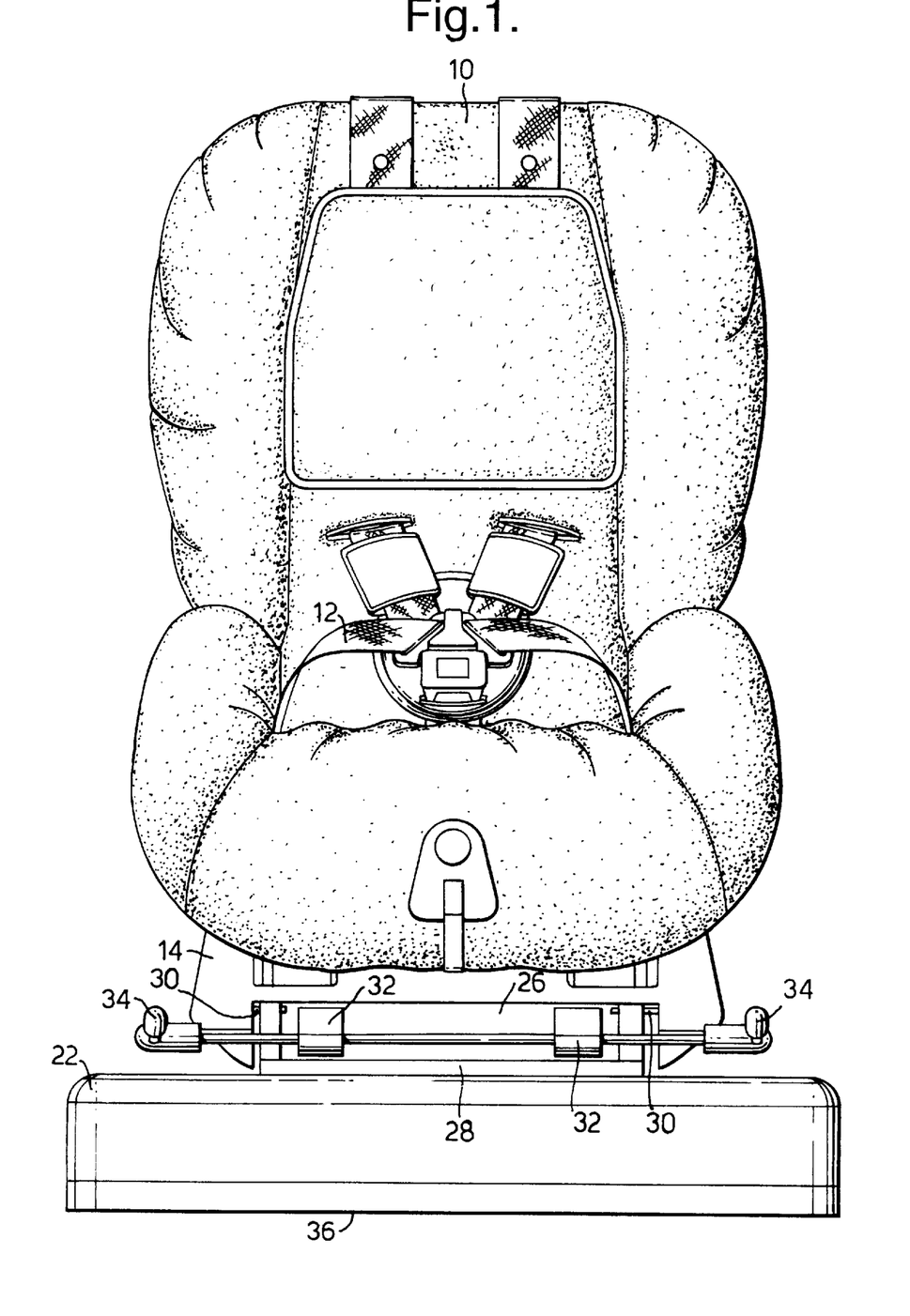
FIG. 1 is a front view of a child safety seat in accordance with the invention, of the type secured by an adult seat belt.
Figure 2:
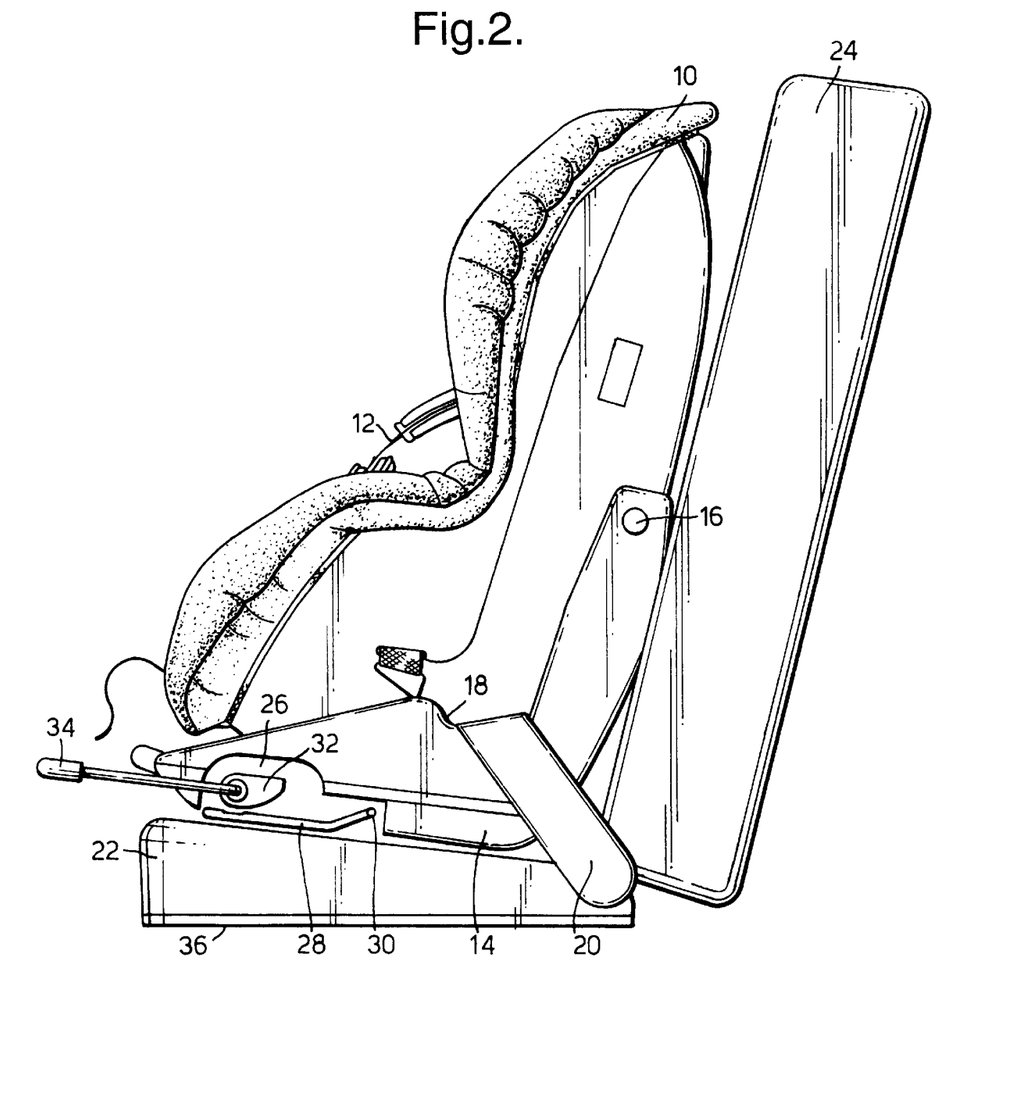
FIG. 2 is a side view of the seat shown in FIG. 1 located on a vehicle seat, with the front foot in its first position.
Figure 3:
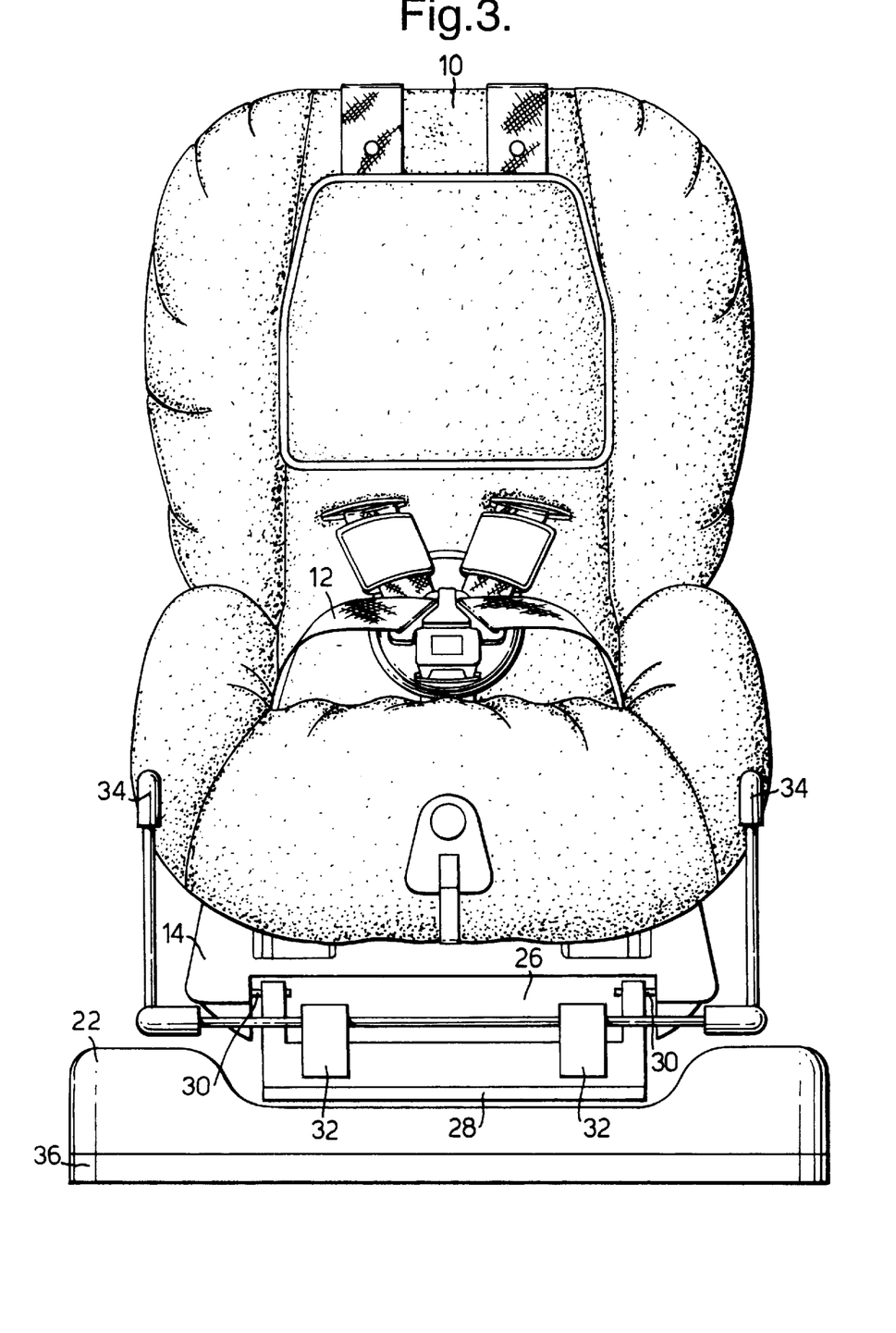
FIGS. 3 and 4 are front and side views, similar to FIGS. 1 and 2, but with the front foot in its second position.
Figure 4:
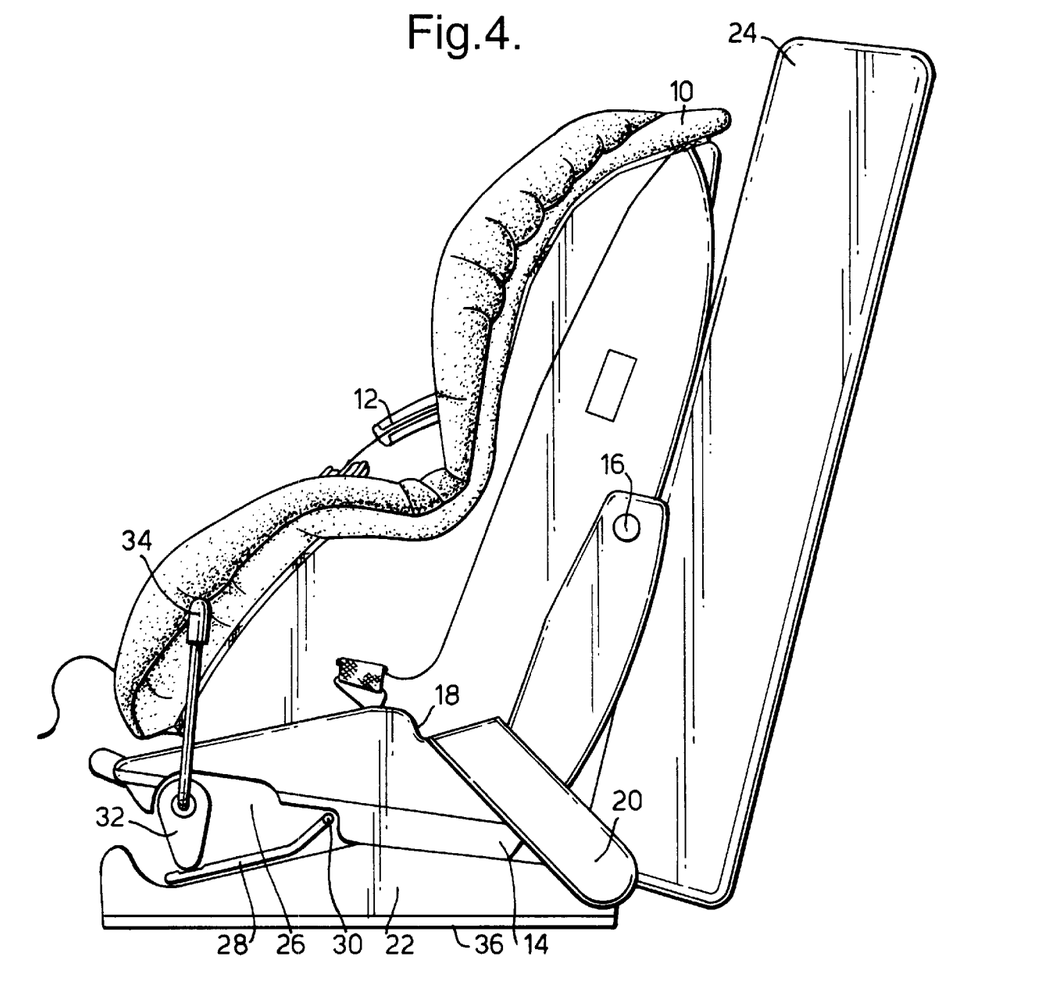

In use, the child seat 10-14 is positioned on the vehicle seat 22-24 with the operating levers 34 projecting forwardly as illustrated in FIGS. 1 and 2. The lap strap 20 is then fastened and tightened. Next, the operating levers 34 are pivoted through about 90° to an approximately vertical position, as illustrated in FIG. 3. The cams 32 force the flap 28 downwards, compressing the front part of the vehicle seat cushion 22 so that the foam material of the seat cushion is heavily compressed between the flap 28 and a rigid seat pan 36 of the vehicle seat. This has the effect of increasing the force necessary to cause any further compression of the seat cushion 22 in the event of an accident. The cams 32 have a flat zone on their radially outer ends which engages with the flap 28 so as to be retained in the position shown in FIGS. 3 and 4 by the resilience of the vehicle seat cushion 22. Additional mechanical retention means may be provided if desired.

Figure 5:
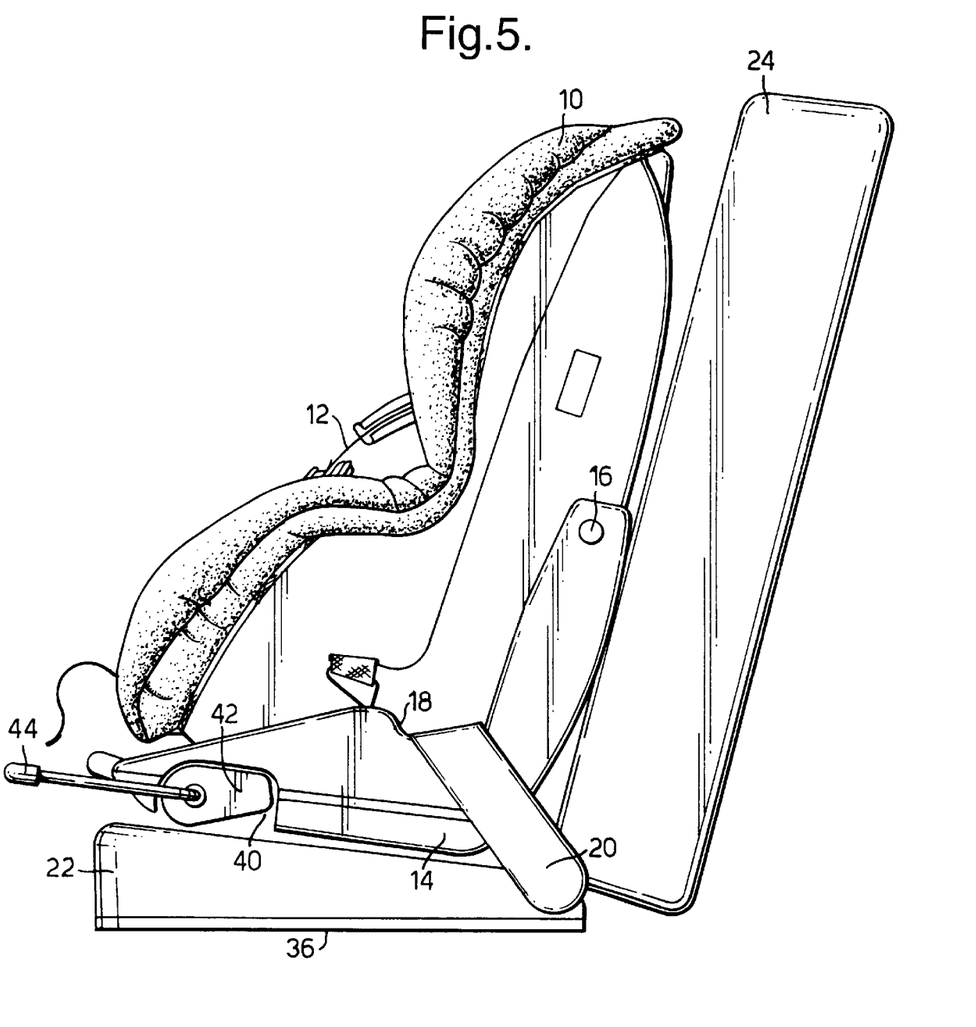
FIG. 5 is a side view of another child seat in accordance with the invention, positioned on a vehicle seat with the front foot in its first position.
Figure 6:
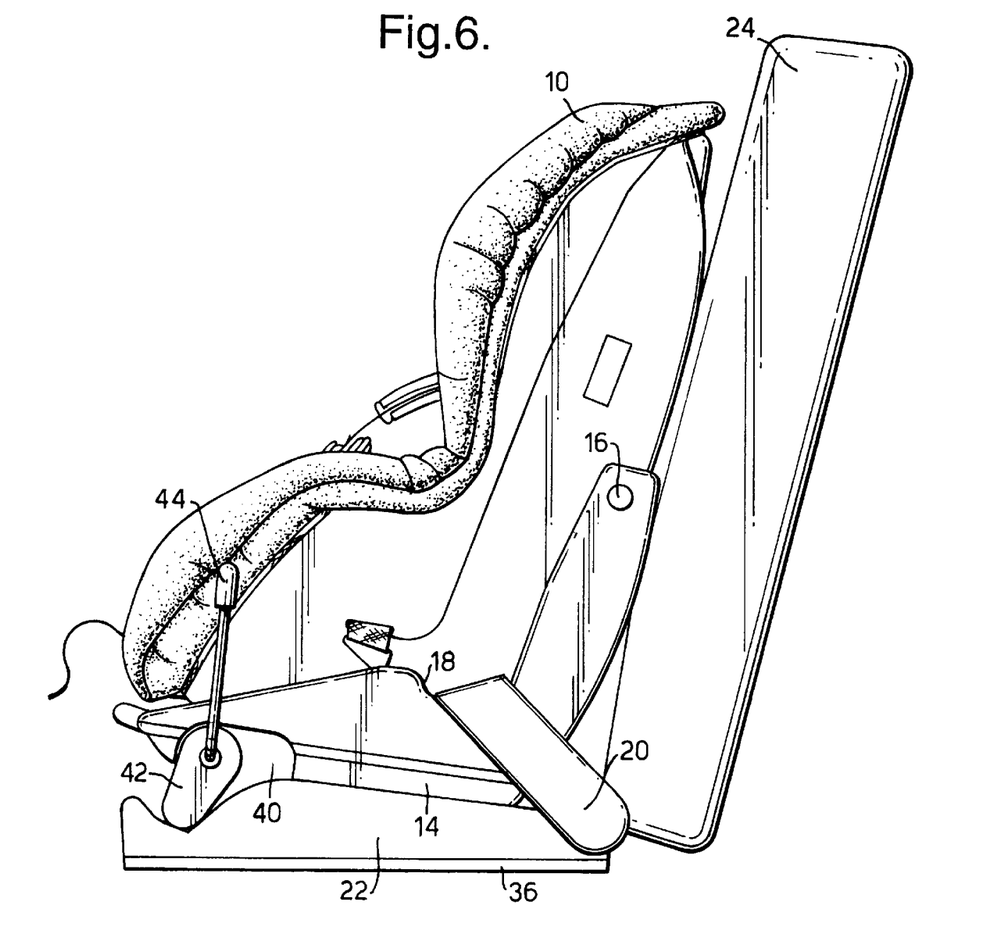
FIG. 6 is a side view, similar to FIG. 5, but with the front foot in its second position.

FIGS. 5 and 6 illustrate a modification to the embodiment shown in FIGS. 1 to 4. Most of the features of the modified seat are the same as corresponding features of the first embodiment and are denoted by the same reference numerals. Such features will not be described again.

Instead of the cavity 26 in the bottom of the front part of the base 14, the seat shown in FIG. 6 has a shorter cavity 40 containing a cam 42 which is larger than the cam 32 and which engages directly with the vehicle seat cushion 22. The child seat 10-14 is installed on the vehicle seat 22-24 with the cam 42 retracted and the operating levers 44 pointing forwardly, as shown in FIG. 5. After the lap strap 20 has been tightened, the operating lever 44 is pivoted to a substantially vertical position, as shown in FIG. 6, in which the cam 42 compresses the front part of the vehicle seat cushion 22.

Figure 7:
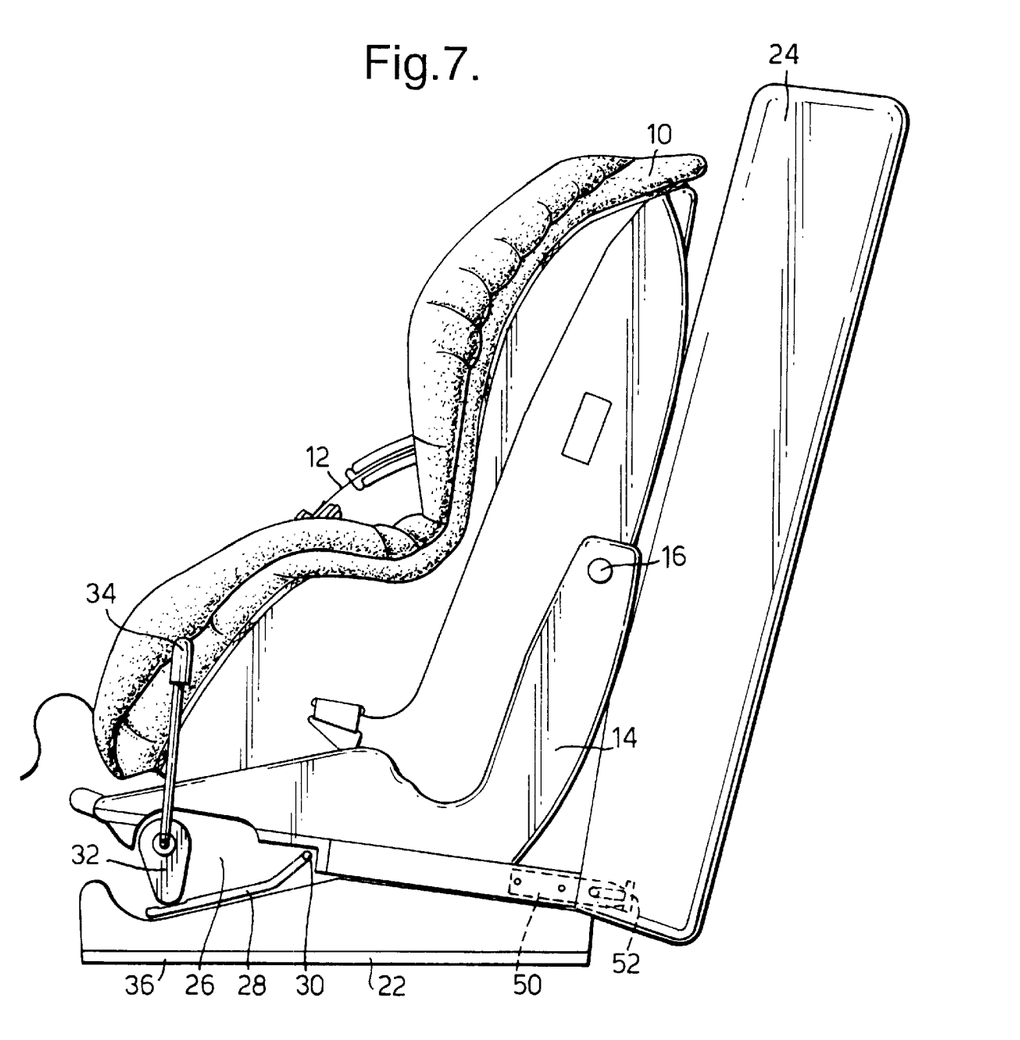
FIG. 7 is a side view, similar to FIG. 4, but showing a seat of the type having rearwardly extending projections engaging with rigid anchorages on the vehicle body.

FIG. 7 shows another modification to the embodiment shown in FIGS. 1 to 4. Instead of being secured to the vehicle seat 22-24 by a lap strap 20, a pair of rearwardly extending projections 50 are secured to respective sides of the base 14 so as to extend between the seat cushion 22 and the backrest 24 of the vehicle seat so as to engage with respective rigid anchorages 52 on the vehicle body.

Figure 8:
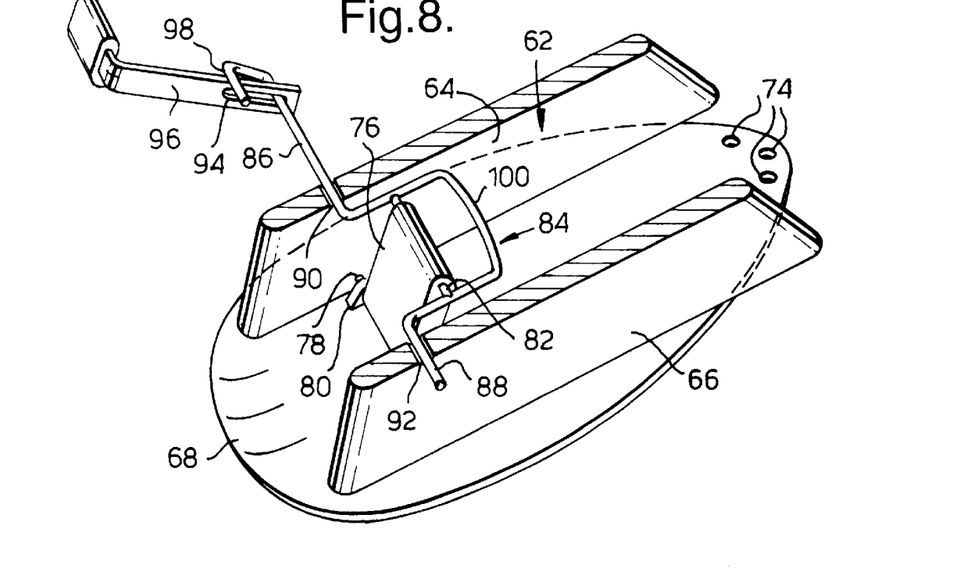
FIG. 8 is a broken-away perspective view of an alternative mechanism for moving the front foot between its first position and its second position.
Figure 9:
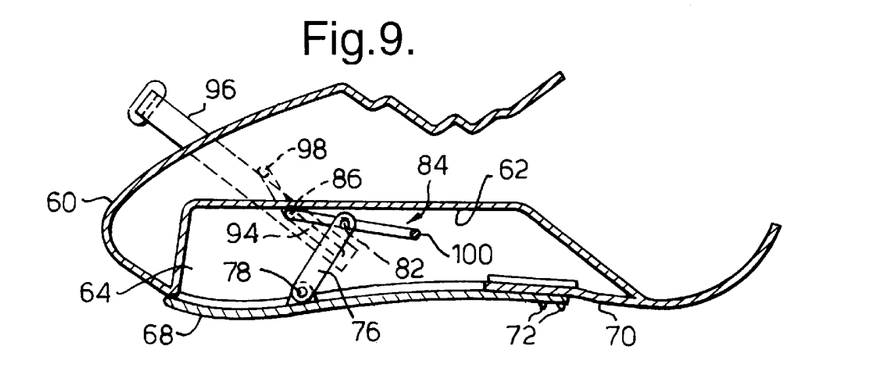
FIG. 9 is a longitudinal cross-sectional view of the front part of the seat portion of a child seat in accordance with the invention having a mechanism shown in FIG. 8, with the front foot in its first position.

FIGS. 8 and 9 show the front of a base part 60 for a child seat, similar to the base part 14 of FIGS. 1 to 4. The base part 60 has a cavity 62, similar to the cavity 26 of FIGS. 1 to 4, but containing two downwardly projecting longitudinally extending ribs 64 and 66. A front foot in the form of a flap 68 of flexible resilient material is secured to a bottom wall 70 of the base part 60 by three screws 72 which extend through respective holes 74 at the rear end of the flap 68. The resilience of the material from which the flap 68 is made is sufficient to bias it into the position shown in FIG. 9 while allowing downward displacement of the front end thereof if a suitable force is applied.

A flat link 76 has one end connected by a pivot shaft 78 to trunnions 80 (one of which is visible in FIG. 8) secured to the upper surface of the flap 68. The upper end of the link 76 is journalled on an inner transverse bar 82 of a double crank 84, the end portions 86 and 88 of which are journalled in respective holes 90, 92 (FIG. 9) in the tops of the ribs 64 and 66 respectively. The end portion 86 also projects through a slot 94 in a handle 96 and carries a hook formation 98 which is engageable with an edge of the handle 96. An outer transverse bar 100 of the double crank 84 extends parallel to and radially outside the inner transverse bar 82, for a purpose to be explained hereinafter. The handle 96 has a hand grip portion extending laterally from the oposite end to the slot 94.

Figure 10:
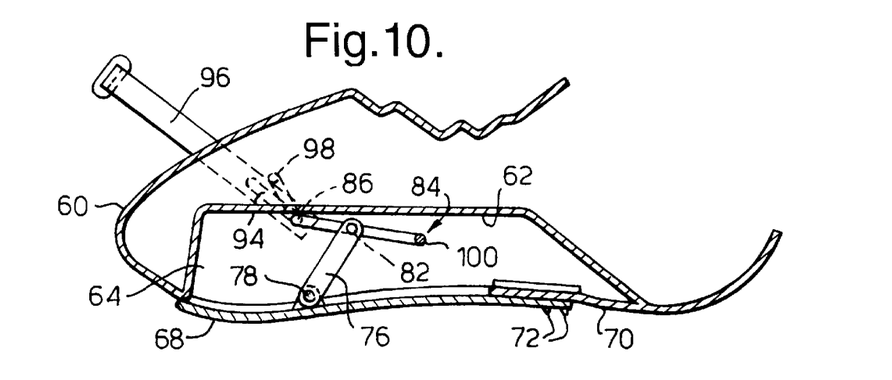
FIGS. 10, 11 and 12 are sectional views, similar to FIG. 9 but showing the mechanism in successive operating positions as the front foot is moved towards its second position.

FIG. 9 shows the mechanism in the condition for storage of the child seat when not fitted in a vehicle. The flap 68 is in its first position and the handle 96 in its stowed position with the end portion 86 of the double crank 84 at the upper end of the slot 94. After the child seat has been positioned on a vehicle seat and secured in place by fixing means such as the lap portion of a vehicle seat belt, the handle 96 is pulled out to the position shown in FIG. 10 in which the end portion 86 of the double crank 84 is at the bottom end of the slot 94.

Figure 11:
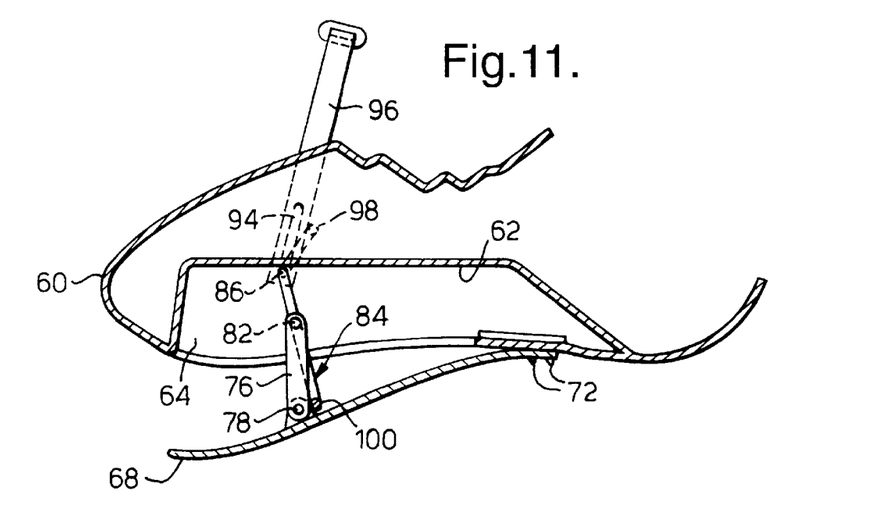
Figure 12:
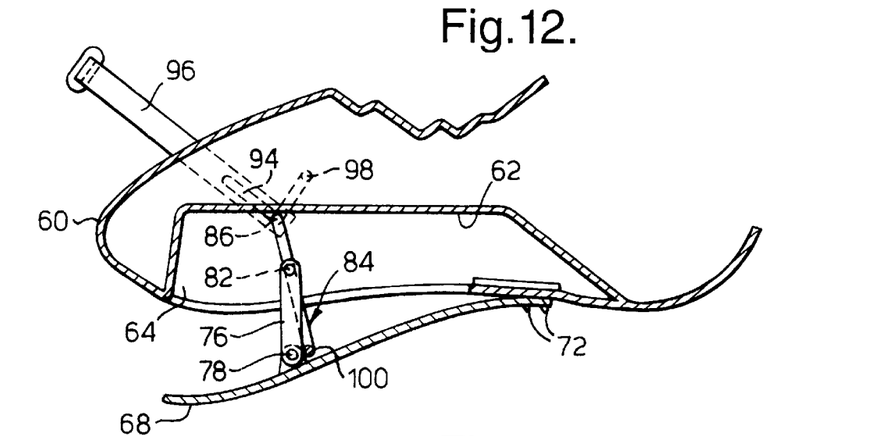
Figure 13:
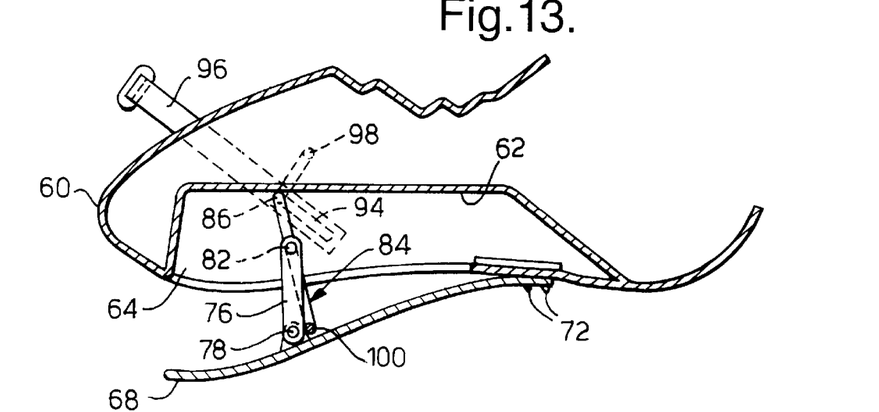
FIG. 13 is a cross-sectional view similar to FIG. 9 but showing the front foot in its second position.

Next, the handle 96 is pivoted towards the rear of the child seat (counter-clockwise as viewed in FIG. 8). Abutment of the side of the handle 96 with the hook formation 98 of the double crank 84 causes corresponding angular movement of the latter to the position shown in FIG. 11, in which the outer transverse bar 100 of the double crank 84 abuts against the link 76. In this position the inner bar 82 of the double crank 84 has moved over-centre relative to a imaginary line between the pivot shaft 78 and the end parts 86 and 88 of the crank. Consequently, the mechanism is retained in this position by the resilience of the flap 68. Finally, the handle 96 is pivoted back to its original orientation, as shown in FIG. 12, in which it can slide to its stowed position as illustrated in FIG. 13. The child seat is now ready for use with the front edge of the vehicle seat cushion compressed by the flap 68. The flap 68 cannot be returned to its first position (shown in FIG. 9) until after the fixing means securing the child seat to the vehicle have been released, thereby relieving the upward force on the flap 68 which maintains the inner bar 82 in its over-centre condition.

The invention is also applicable to rearward facing child seats.

What is claimed is:

1. A child safety seat comprising a seat body including a base, fixing means extending from a rear part of the seat body for securing the child seat on a vehicle seat, a front foot mounted on the base so as to support a front part thereof, the front foot being movable between a first position and a second position in which the front foot projects downwardly from said base to a greater extent that when the front foot is in the first position, and a manually operable member having a hand grip portion for moving the front foot from the first position to the second position, wherein the distance of movement of the hand grip portion is greater than the distance of movement of the front foot, and the manually operable member has an intermediate position, between said first and second positions, in which the front foot projects downwardly from the base to a greater extent that when the front foot is in the second position.

2. A child safety seat according to claim 1, wherein the front foot comprises a panel pivotally mounted on the seat body by a pivotal connection extending along an edge thereof, and the manually operable member comprises a lever secured to a pivotally mounted cam which engages with a surface of the panel.

3. A child safety seat according to claim 1, wherein the front foot comprises a cam pivotally mounted on the seat body, and the manually operable member comprises a lever secured to said cam.

4. A child safety seat according to claim 1, wherein a crank having an offset portion is pivotally mounted on the base, a link is pivotally connected at one end to the offset portion and at an opposite end to the front foot, and a coupling connects the manually operable member to the crank so that angular movement of the manually operable member in a first direction causes angular movement of the crank in said first direction so as to move the front foot from said first position to said second position.

5. A child safety seat according to claim 4, wherein the crank includes a formation arranged to abut against said link to prevent angular movement of said crank in the first direction beyond the orientation corresponding to the second position of the front foot.

6. A child safety seat according to claim 5, wherein said coupling is arranged to allow angular movement of the manually operable member in a second direction opposite to said first direction without causing angular movement of the crank.

7. A child safety seat in combination with a vehicle seat having a vehicle seat back and a resiliently compressible vehicle seat cushion, the child seat comprising a seat base including a bottom portion resting on said vehicle seat cushion and a back portion rigidly connected to the bottom portion, a front foot mounted on the base portion for movement between a first position and a second position in which the foot projects downwardly from the bottom portion to a greater extent that when the foot is in the first position, and fixing means projecting between the vehicle seat cushion and the vehicle seat back and engaging with the seat base for securing the child seat on the vehicle seat with the back portion abutting the vehicle seat back and the foot abutting the vehicle seat cushion so that said foot compresses said vehicle seat cushion as said foot is moved from the first position to the second position.

8. A child safety seat according to claim 7, wherein the fixing means comprises a flexible strap.

9. A child safety seat according to claim 8, wherein the flexible strap comprises a vehicle seat belt lap strap.

10. A child safety seat according to claim 7, wherein the fixing means comprises a pair of rearwardly extending projections secured to respective sides of the seat body so as to extend between the seat cushion and the backrest of the vehicle seat so as to engage with respective rigid anchorages on the vehicle.

11. A child safety seat according to claim 7, further comprising a manually operable member having a hand grip portion for moving the front foot from said first position to said second position, the distance of movement of the hand grip portion being greater than the distance of movement of the front foot.

12. A child safety seat according to claim 11, wherein the front foot comprises a panel pivotally mounted on the seat body by a pivotal connection extending along an edge thereof, and the manually operable member comprises a lever secured to a pivotally mounted cam which engages with a surface of the panel.

13. A child safety seat according to claim 11, wherein the front foot comprises a cam pivotally mounted on the seat body, and the manually operable member comprises a lever secured to said cam.

14. A child safety seat wherein in combination with a vehicle seat having a seat back and a resiliently compressible seat cushion, the child seat comprising a seat body including a base, fixing means extending between the vehicle seat cushion and the vehicle seat back for securing the child seat on the vehicle seat, a front foot mounted on the base so as engage with a front part of the vehicle seat cushion so as to compress said seat cushion as the foot is moved from a first position to a second position in which the foot projects downwardly from the seat body to a greater extent that when in said first position and a manually operable member having a hand grip portion for moving the front foot from said first position to said second position, the distance of movement of the hand grip portion being greater than the distance of movement of the front foot;

wherein the manually operable member has an intermediate position between said first and second positions in which the front foot projects downwardly from the seat body to a greater extent that when in said second position.

15. A child safety seat according to claim 14, wherein the front foot comprises a panel pivotally mounted on the seat body by a pivotal connection extending along an edge thereof, and the manually operable member comprises a lever secured to a pivotally mounted cam which engages with a surface of the panel.

16. A child safety seat according to claim 14, wherein the front foot comprises a cam pivotally mounted on the seat body, and the manually operable member comprises a lever secured to said cam.

17. A child safety seat according to claim 14, wherein a crank having an offset portion is pivotally mounted on the base, a link is pivotally connected at one end to the offset portion and at an oposite end to the front foot, and a coupling connects the manually operable member to the crank so that angular movement of the manually operable member in a first direction causes angular movement of the crank in said first direction so as to move the front foot from said first position to its second position.

18. A child safety seat according to claim 17, wherein the crank includes a formation arranged to abut against said link to prevent angular movement of said crank in the first direction beyond the orientation corresponding to the second position of the front foot.

19. A child safety seat according to claim 18, wherein the coupling is arranged to allow angular movement of the manually operable member in a second direction opposite to said first direction without causing angular movement of the crank.

* * * * *